(12) United States Patent
Klar

(10) Patent No.: US 7,461,855 B2
(45) Date of Patent: Dec. 9, 2008

(54) INTERLOCKING DEVICE FOR TELESCOPIC TOW BAR LEGS

(75) Inventor: Kenneth J. Klar, Washougal, WA (US)

(73) Assignee: Jerry Edwards, Portland, OR (US)

( * ) Notice: Subject to any disclaimer, the term of this patent is extended or adjusted under 35 U.S.C. 154(b) by 326 days.

(21) Appl. No.: 11/231,491

(22) Filed: Sep. 20, 2005

(65) Prior Publication Data

US 2007/0114761 A1    May 24, 2007

(51) Int. Cl.
    *B60D 1/40* (2006.01)
(52) U.S. Cl. .............. 280/478.1; 280/479.2; 280/491.2
(58) Field of Classification Search .............. 280/478.1, 280/479.2, 491.2
    See application file for complete search history.

(56) References Cited

U.S. PATENT DOCUMENTS

| | | | | | |
|---|---|---|---|---|---|
| 3,891,237 | A | * | 6/1975 | Allen | ......................... 280/477 |
| 4,991,865 | A | * | 2/1991 | Francisco | ................... 280/477 |
| 5,580,088 | A | * | 12/1996 | Griffith | ..................... 280/479.2 |
| 5,957,477 | A | * | 9/1999 | Ensz et al. | .................. 280/482 |
| 6,227,305 | B1 | * | 5/2001 | Sayer | ........................ 172/439 |
| 6,357,779 | B1 | * | 3/2002 | Mok et al. | ............... 280/478.1 |

* cited by examiner

*Primary Examiner*—Lesley D Morris
*Assistant Examiner*—Michael R Stabley
(74) *Attorney, Agent, or Firm*—Ian F. Burns & Associates, P.C.

(57) ABSTRACT

One possible embodiment of the invention could comprise an interlocking device for the adjusting the length of at least one telescopic tow bar leg of a tow bar. The telescopic tow bar leg could comprise an inner bar and outer bar, the inner bar being generally movably received by the outer bar. Movement of an outer bar mounted pawl into engagement with inner bar may lock the inner bar in relationship to the outer bar. A pawl release mechanism may be used to either act directly upon the pawl or to rotate a cam that contacts the pawl. Either action generally causes the at least two surfaces of the pawl to move out of contact with the inner bar's pawl engagement area, thus substantially allowing the inner bar to move relative to the outer bar. This could allow a user to adjust the length of the telescopic leg.

17 Claims, 11 Drawing Sheets

INTERLOCKING DEVICE FOR TELESCOPIC TOW BAR LEGS

FIELD OF INVENTION

The present invention generally relates to interlocking devices. More particularly, the present invention relates to interlocking devices for telescopic tow bar legs.

BACKGROUND

A tow bar may be used to allow a towing vehicle to be attached to and move a towed vehicle. A tow bar may have one or more telescopic tow bar legs, which may allow the towing vehicle to connect a towed vehicle. The telescopic tow bar leg may have an interlocking device, which generally reversibly fixes or locks the length of the telescopic tow bar leg. This type of telescopic adjustment may allow for change in one or more dimensions of the tow bar itself. This telescopic adjustment could allow the tow bar to generally become more compact when it is stored during non-use. This adjustment could also possibly facilitate the releasing (and attaching) of the tow bar to the vehicles involved in the towing operations.

Operational issues may arise when the tow bar (and hence the interlocking device) is subject to a load, used in adverse environmental conditions or in both situations. A load could occur when parked towed vehicles and parked towing vehicles are so placed (e.g., on an incline) when the length of the tow bar needs to be adjusted by the operator. In such a situation, the tow bar (and hence the telescopic tow bar legs) needs to be compacted in order to release the pressure exerted upon it by the vehicles involved in the tow. Similarly, adverse environmental conditions (e.g., rust) could generally cause the interlocking device to malfunction (e.g. bind, jam up, and the like). This malfunction could generally prevent the desired adjustment of the length of telescopic tow bar leg(s).

What is generally needed therefore is an interlocking device for a telescopic tow bar leg, which is generally reliable and easy to operate (e.g., lock and unlock) without jamming when the tow bar is under a load, exposed to adverse elements, and the like.

SUMMARY OF ONE EMBODIMENT OF THE INVENTION

Advantages of One or More Embodiments of the Present Invention

The various embodiments of the present invention may, but do not necessarily, achieve one or more of the following advantages:

provide a interlocking device that will not freeze or bind in a locked position during usage;

provide an interlocking device that an operator can unlock when the interlocking device is under a load, pressure or the like;

provide an interlocking device that will unlock when exposed to adverse environmental conditions;

the ability to provide a release mechanism, which indirectly works upon the locking portion of the interlocking device;

provide a release mechanism, which directly works upon the locking portion of the interlocking device;

the ability to use a cam to unlock a telescopic tow bar leg;

the ability to place the tow bar into a more compact state for storage;

provide an indicator to denote a locked condition of the telescopic tow bar leg; and provide an indicator to denote an unlocked condition of the telescopic tow bar leg.

These and other advantages may be realized by reference to the remaining portions of the specification, claims, and abstract.

Brief Description of One Embodiment of the Present Invention

One possible embodiment of the invention could be a telescopic tow bar leg comprising at least one inner bar configured to be slideably received within an outer bar; a multiple surfaced pawl rotateably supported and positioned by the outer bar to allow at least some of the multiple surfaces of the pawl to contact the inner bar; wherein the contact of some of the multiple surfaces with the inner bar locks the position of the inner bar relative to the outer bar.

Another possible embodiment could be a tow bar comprising a towed vehicle attachment means for attaching the tow bar to a towed vehicle; a towing vehicle attachment means for attaching the tow bar to a towing vehicle; at least one adjustable length connection means for adjusting the length between the towed vehicle attachment means to the towing vehicle attachment means; multiple surface means for contacting an anvil means; and an anvil means for receiving multiple surface means.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

Certain embodiments of the invention are shown in the following drawings where.

DESCRIPTION OF AT LEAST ONE EMBODIMENT OF THE INVENTION

In the following detailed description of the preferred embodiments, reference is made to the accompanying drawings, which forms a part of this application. The drawings show, by way of illustration, specific embodiments in which the invention may be practiced. It is to be understood that other embodiments may be utilized and structural changes may be made without departing from the scope of the present invention.

Tow Bar

Figure 1:
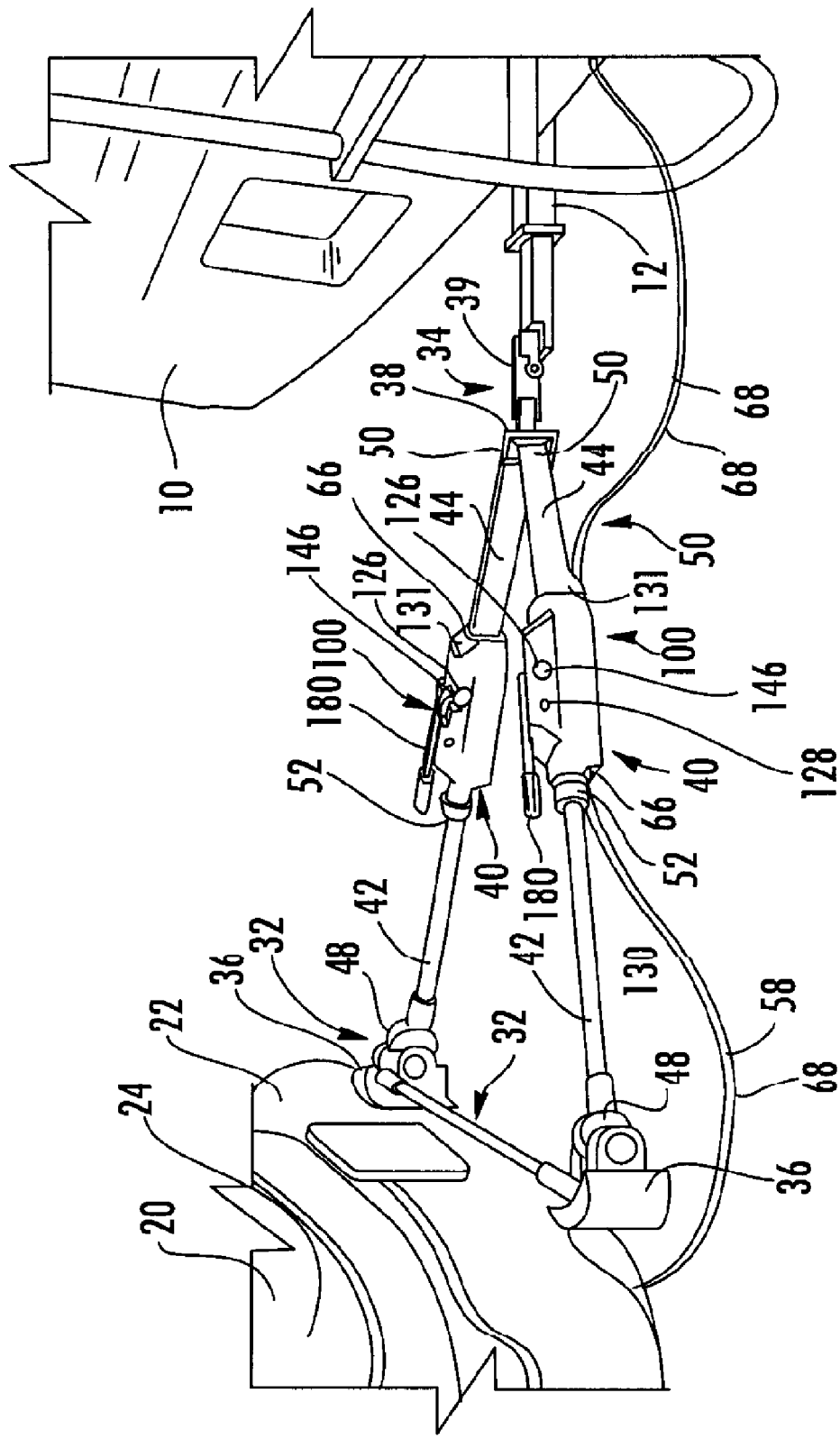
FIG. 1 is substantially a perspective view of an embodiment of the invention.
Figure 2:
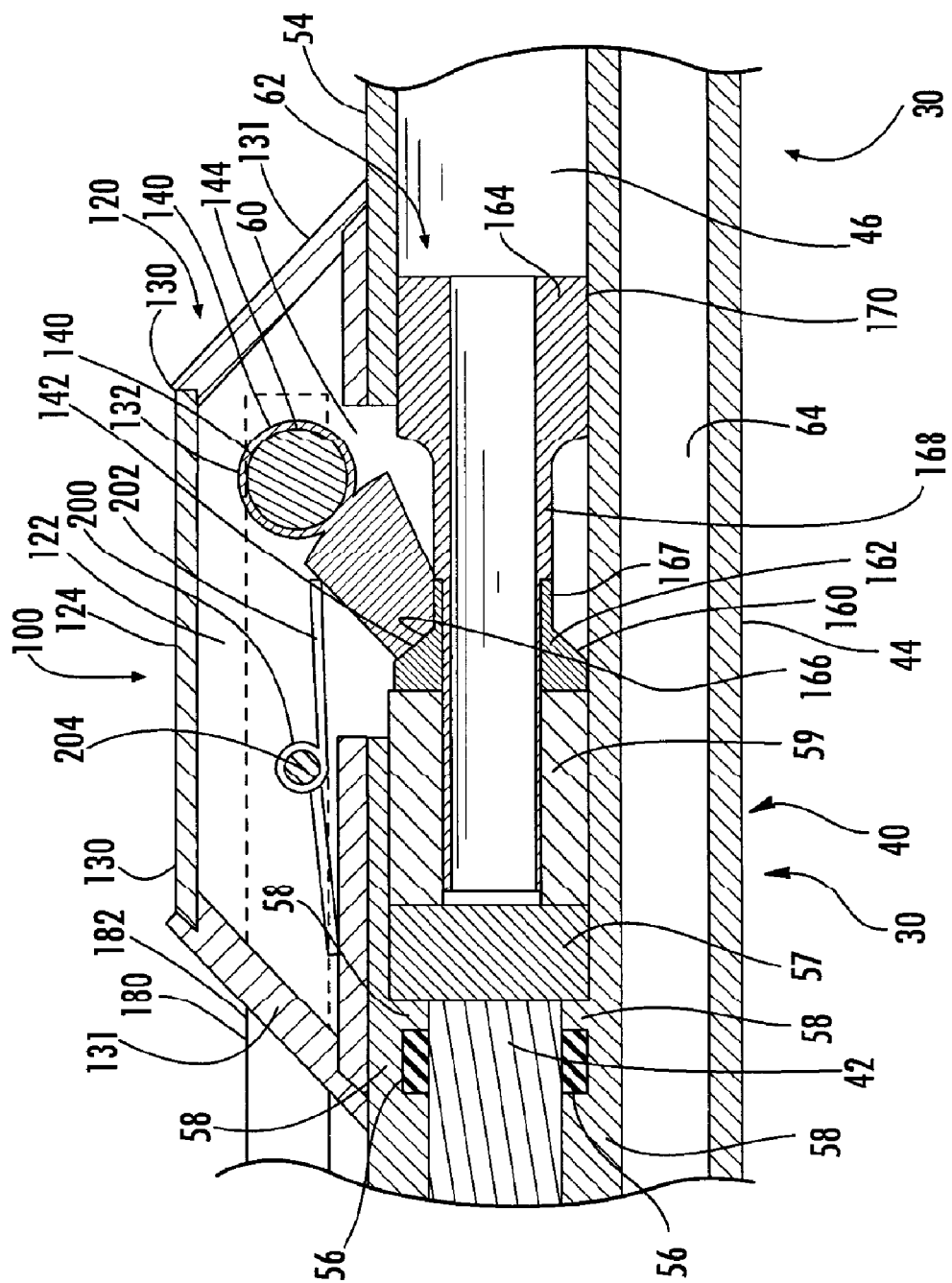
FIG. 2 is substantially a longitudinal cross-sectional view of one embodiment of the invention, wherein the inner bar is in a locked position within the outer bar.
Figure 3:
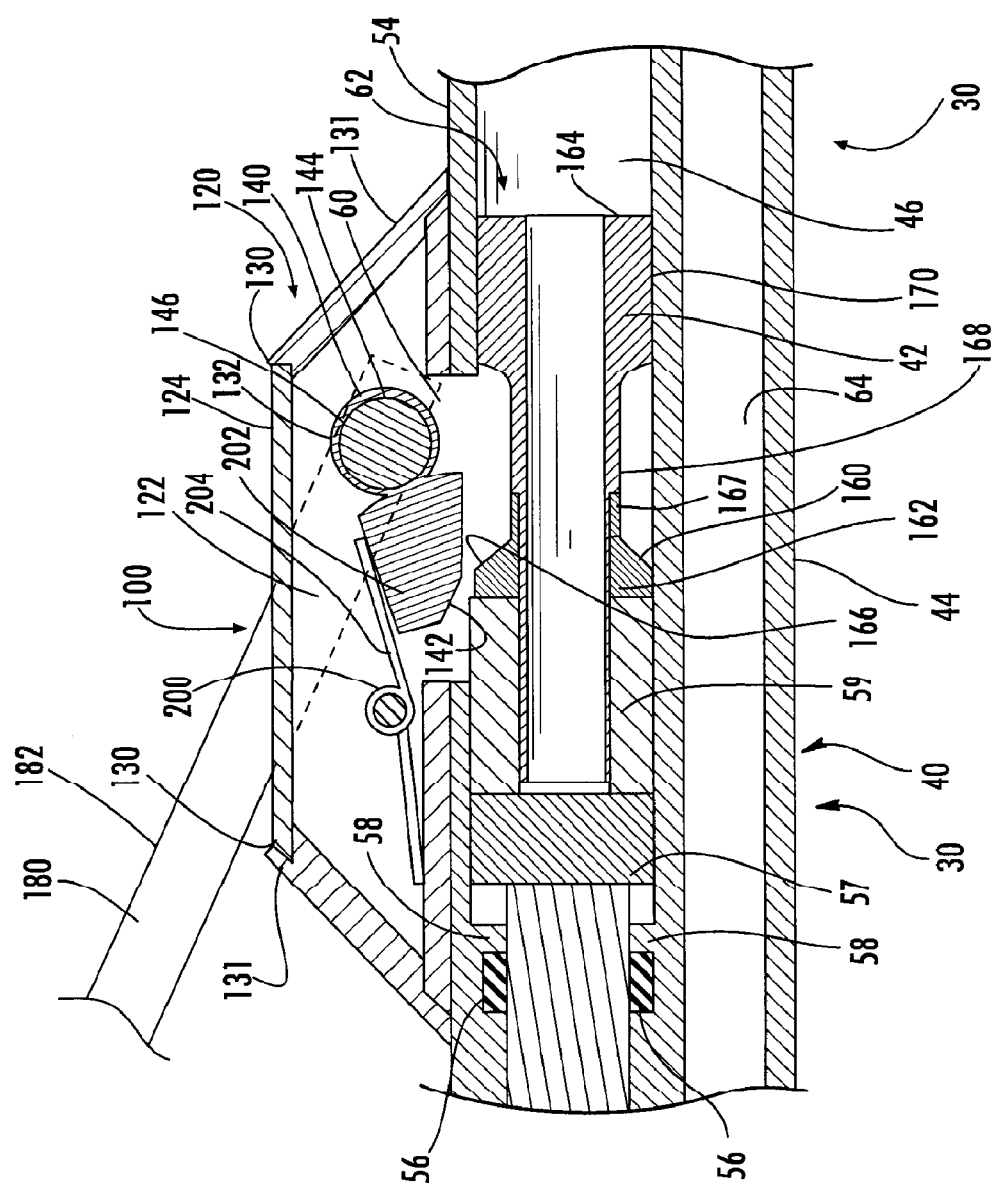
FIG. 3 is substantially a longitudinal cross-sectional view of one embodiment of the invention, wherein the inner bar is in an unlocked position within the outer bar.

Referring to FIGS. 1, 2, and 3, a tow bar, generally indicated by reference number 30, may be shown as being mounted between a towing vehicle 10 and a towed vehicle 20. The towing vehicle 10 can be almost any vehicle, such as a car, truck or motor home, which may have a conventional receiver hitch 12 attached to it. The towed vehicle 20 may be almost any vehicle, such as a car, truck or SUV, that is desired to be towed or otherwise transported, which has suitable attachment points (e.g. chassis [not shown], bumper 22, body 24, and the like) for attaching the tow bar 30 to the towed vehicle 20.

A typical application of the tow bar 30 could possibly be to tow a passenger car by a motor home. Once the towing vehicle 10 (e.g., a motor home) reaches the operator's particular destination (e.g., campsite), the tow bar 30 may be disengaged from one or more of the vehicles involved in the towing or transportation (e.g., the towed vehicle 20). The towed vehicle 20 (e.g., a passenger car) can then be used for travel to and from the location while the towing vehicle 10 (e.g., motor home) stays parked (e.g., at the campsite).

Another possible application of the tow bar 30 could be moving a towed vehicle 20 from the operator's old home to a new home located a significant distance from the old home. In such a scenario, the tow bar 30 could be attached to the moving van (e.g., the towing vehicle 10) to tow the family car (e.g., the towed vehicle 20) to the new home site or the like.

In at least one embodiment, a tow bar 30 may employ one or more telescopic tow bar legs 40 that movably connect a base assembly 32 to a connector bar 34. The telescopic tow bar leg may comprise of base assembly end 48 and a connector bar end 50. The base assembly 32 may have two telescopic bar leg ends 36, with each telescopic bar leg end 36 pivotally attached to the each telescopic tow bar leg 40 at the base assembly end 48. The connector bar 34 may have a tow bar leg end 38 and a hitch end 39. The connector bar end 50 of the telescopic tow bar legs 40 may both be moveably (e.g., pivotally) attached to the tow bar end 38 of the connector bar 34 so that the tow bar 30 generally forms an "A" shape.

The base assembly 32 may be used to reversibly and moveably attach the tow bar 30 to the towed vehicle 20 while the connector bar 34 may be used to reversibly attach the tow bar 30 to the towing vehicle 10. The attachment of the base assembly 32 to the towed vehicle 20 may be through the chassis (not shown), bumper 22, body 24, and the like (or combinations thereof) of the towed vehicle 20

The hitch end 39 of the connector bar 34 may be used to reversibly and moveably attach the tow bar 30 to a receiver hitch 12 of the towing vehicle 10. In at least one embodiment, attachment of the connector bar 34 to the receiver hitch 12 may be accomplished by providing the hitch end 39 of the connector bar 34 with a ball hitch socket (not shown) that reversibly receives a ball hitch (not shown) of a receiver hitch 12. Attachment of the connector bar 34 to the towing vehicle 20 may also be through any other suitable means of attachment.

The telescopic tow bar legs 40 in at least one embodiment may further comprise an inner bar 42, outer bar 44, and an interlocking device 100. The outer bar 44 can be seen having two ends, a connector bar end 50 and inner bar aperture 52 (shown in FIG. 1), with a generally hollow outer bar interior 46. The inner bar can be seen as having two ends as well, a base assembly end 48 (shown in FIG. 1) and outer bar end 62. The inner bar aperture 52 (shown in FIG. 1), generally allows the hollow outer bar interior 46 of the outer bar 44 to reversibly receive in a sliding fit at least a portion of outer bar end 62 of the inner bar 42. This adjustable attribute may allow the telescopic tow bar leg 40 to assume or collapse to smaller proportions (e.g., generally enter into a compact state) to allow for length adjustment of the telescopic tow bar leg 40 as well as for the easier storage of the tow bar 30 when it is generally not being used for towing.

A portion of the outer bar interior 46 of may be fitted with an aperture collar 56 located proximate to the inner bar aperture 52 (shown in FIG. 1). This aperture collar 56 may be made from low friction material (e.g., Nylontron) to facilitate the sliding of the inner bar 42 relative to the outer bar interior 46.

The outer bar end 62 of the inner bar 42 may be fitted with a retaining collar 57, which could be made of suitable metal that generally interacts with a ridge 58 located proximate to the aperture collar 56. This interaction restrains the inner bar 42 from fully leaving the outer bar interior 46 though the inner bar aperture 52 once the inner bar 42 is assembled with the outer bar 44 to form the telescopic tow bar leg 40. The inner bar 42 may also be further fitted with one or more generally fixed sliding collars 59 (e.g., bushings generally made of low friction material, like Nylontron) to generally assist the sliding of the inner bar 42 within the outer bar 44.

The inner bar 42 may be cylindrical in shape, but other embodiments may be rectangular, triangular, or other shapes known in the art. Correspondingly, at least a portion of the outer bar interior 46 may be constructed to generally match the configurations of the inner bar 42 for a general sliding fit. The inner bar 42 and outer bar 44 may be made of steel, but may also be made of plastic, polymer, wood, or other suitable materials known in the art.

The term "sliding fit" may be used to refer to a general configuration between inner bar 42 and the outer bar 44 wherein the inner bar 42 has little or no room to deviate from an axis of movement within the outer bar 44. The sliding fit configuration may be seen as minimizing the possibility of a generation of friction between an inner bar 42 and the outer bar 44 when the inner bar 42 is not locked into the outer bar 44 by an interlocking device 100. Otherwise, the possibility of occurrence of friction in such a situation could possibly result generally in a "bind", wherein the movement of an unlocked inner bar 42 in relation to the outer bar 44 may be difficult or even impossible.

In at least one embodiment of the outer bar 44, a second hollow interior or lower channel 64 is located beneath and parallel to the outer bar interior 46. This lower channel 64 may be located at the bottom of the outer bar 44 and generally runs along a portion of the length of the outer bar 44. The lower channel 64 generally has a set of channel apertures 66, with one channel aperture 66 (shown in FIG. 1) located at each end of the lower channel 64 so as to generally connect the generally hollow interior of the lower channel 64 to an outside environment. In this manner, at least one embodiment the invention could have electrical wire(s) 68 (shown in FIG. 1) routed through the lower channel(s) 64 so as to connect various electrical components (not shown) that may found in or used in conjunction with the vehicles involved in the towing operation. The routing of the electrical wires 68 through the lower channel 64 may be seen as a means of preventing the wire(s) 68 from being dragged on the ground, getting caught on the tow bar 30, and the like during towing operations.

Referring now to FIGS. 2, 3, 4, 5, 6, 7, 8, and 9, the telescopic tow bar leg 30 may further comprise of an interlocking device 100, which may help fix the position of the inner bar 42 relative to the outer bar 44.

The Interlocking Device

In one possible embodiment, the interlocking device 100 may comprise a lock housing 120, a pawl 140, a pawl engagement section 160, a pawl release mechanism 180, and a pawl biasing device 200. In another version of the embodiment, the interlocking device 100 may further feature a locking indicator 220.

The pawl 140 may be moveably connected to the outer bar 44 so pawl 140 may be located proximate to a pawl aperture 60 that is located on the outer bar exterior 54. The pawl aperture 60 generally connects the outer bar exterior 54 to the outer bar interior 46. The pawl 140 is so situated that it may be moved (e.g., rotated) so that at least a portion of the pawl 140 may generally be seen as passing from the outer bar exterior 54 through the pawl aperture 60 and into the outer bar interior 46. During this movement, the operating area 142 of the pawl 140, may be seen as generally being capable of engaging or abutting at least at least a portion of the pawl engagement section 160, generally located on the inner bar 42 (substantially proximate to the outer bar end 62), to generally lock or fix the position of the inner bar 42 relative to the outer bar 44.

The pawl 140 may be seen as having an axis 144 at one end about which the pawl 140 generally moves (e.g., rotates) relative to the pawl aperture 60 to present the operating area 142 of the pawl 140 into general contact (e.g., abutment) with the pawl engagement section 160. The operating area 142 may have one or more surfaces that lie in different planes so as to be angled to one another. In this manner, one surface may contact an angled shoulder 166 of the anvil 162 of the pawl engagement section 160, while another surface may contact a collar portion 167 of the anvil 162 of the pawl engagement section 160.

The pawl engagement section 160 may be spindle-shaped and could comprise an anvil 162 (against which the pawl operating area 142 rests to lock the position of the inner bar 42 relative to the outer bar 44) and a low friction shoulder sleeve 164. The anvil 162 may further comprise two sections, an angled shoulder 166 and collar portion 167, both of which may come into contact with two or more surfaces of the operating area 142 of the pawl 140. The surfaces of the angled shoulder 166 and the collar portion 167, which may come into contact with the pawl, may lie in different planes. In order to facilitate the removal of the pawl 140 from contact with the anvil 162 (e.g., the activation of the pawl release mechanism 180), both the surface of operating area 142 of the pawl 140 that comes into contact with the surface of the angle shoulder 166 of the anvil 162, and the angle shoulder 166 of the anvil 162 may have generally similar radial angles as measured from the axis 144 of pawl 140.

Both the pawl 140 and the anvil 162 may be made of generally strong and corrosion resistant materials, such as 17-4 stainless steel, which is heat treated to a 42 on the Rockwell scale. These materials may assist in resisting unwanted binding (e.g., the jamming) of the pawl 140 to the anvil 162 of the pawl engagement section 160 when operating under a load, in adverse environmental conditions, and the like.

The low friction shoulder sleeve 164 may further comprise a waist section 168 generally connected to a shoulder section 170. The waist section 168 is of sufficient small diameter so as to help avoid blocking the pawl 140 when it is moved into general contact with the anvil 162. The shoulder section 170, which comes into general contact with the outer bar interior 46, may be made from a low friction material (e.g., Nylontron), which may facilitate the movement of the inner bar 42 within the outer bar interior 46. The surface of the operating area 142 that contacts the collar portion 167 of the anvil 162 may be oriented parallel to the surface of the waist section of the shoulder sleeve 170, when that surface contacts the collar portion 167.

In at least one embodiment, at least a portion of the pawl 160 may be located within a lock housing 120 that may be seen as being generally located on the outer bar exterior 54 proximate to the pawl aperture 60. The lock housing 120 may have an interior 122 (which is generally hollow) and exterior 124, which may be generally connected together by a set of pawl axis apertures 126 (shown in FIG. 1), a set of spring pin apertures 128 (shown in FIG. 1), and one or more sealable access apertures 130. In at least one embodiment, the lock housing may further have a set of cam apertures 132 (see figures 5 and 6). In at least one embodiment, the lock housing may further have a locking indicator aperture 134. The sealable access apertures may be reversibly sealed by aperture seals 131. The ends 146 of the pawl axis 144 may movably fit into the respective pawl axis apertures 126 to allow movement (e.g., rotational) of the pawl 140.

In at least one embodiment, the pawl release mechanism 180 may be a rotation device 182 (e.g. a lever or handle), which may be directly connected (e.g., radially) to the pawl 140 at end 146 of a pawl axis 144. In such a version, the pawl release mechanism 180 (e.g., the rotation device 182) could be located outside of the lock housing 120. In this manner, the operator could grab and rotate the rotation device 182 to rotate the pawl 140. Such movement could be used to rotate the pawl 140 out of contact with the pawl engagement section 160 and against any force provided by the pawl biasing device 200. In the alternative, for example, should pawl biasing device 200 fail in its general task of orienting the pawl 140 towards contact with the pawl engagement section 160, the movement of the rotation device 182 could be used to rotate the pawl 140 generally towards contact with the pawl engagement section 160.

Figure 4:
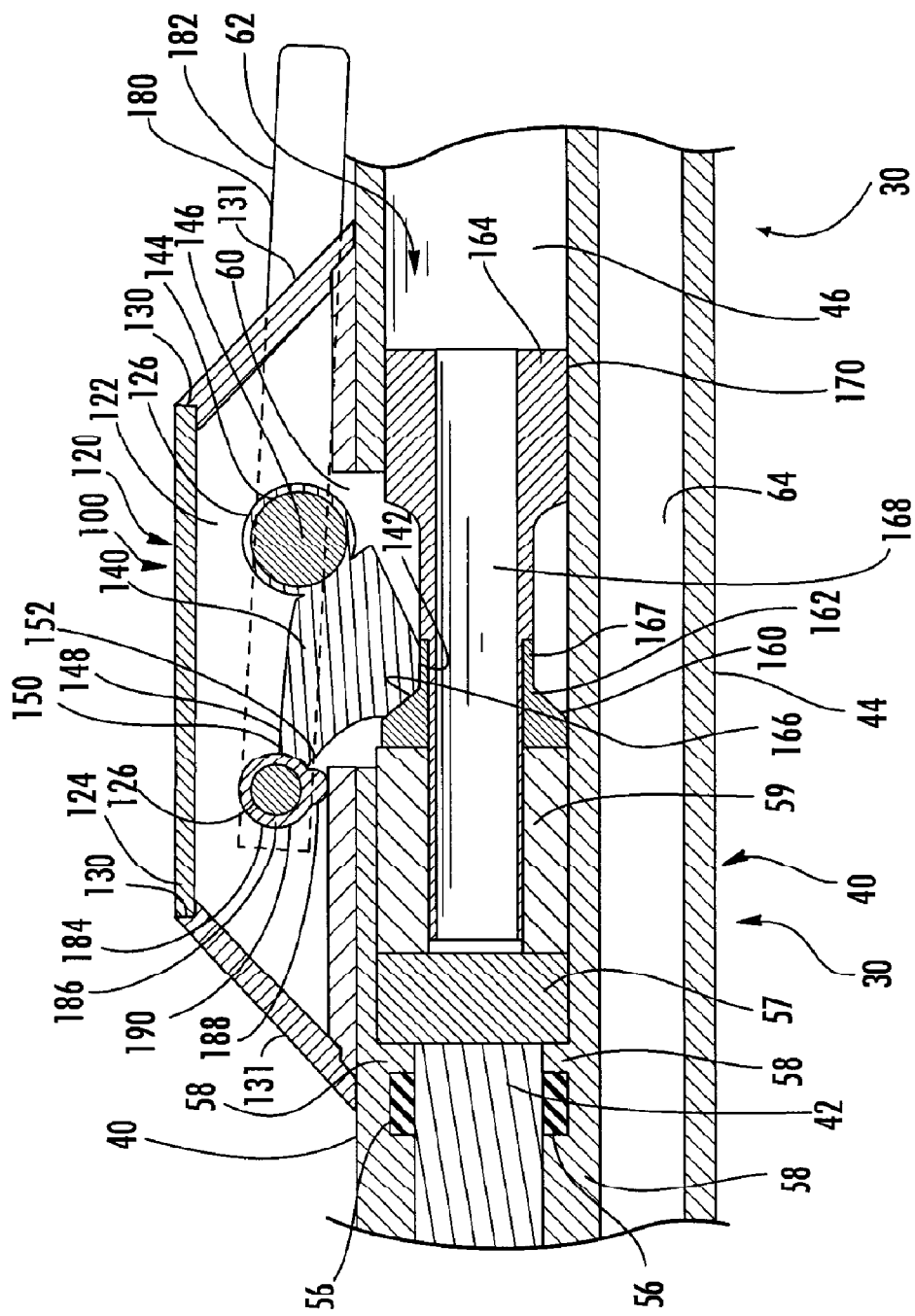
FIG. 4 is substantially a longitudinal cross-sectional view of another embodiment of the invention, wherein the inner bar is in a locked position within the outer bar.
Figure 5:
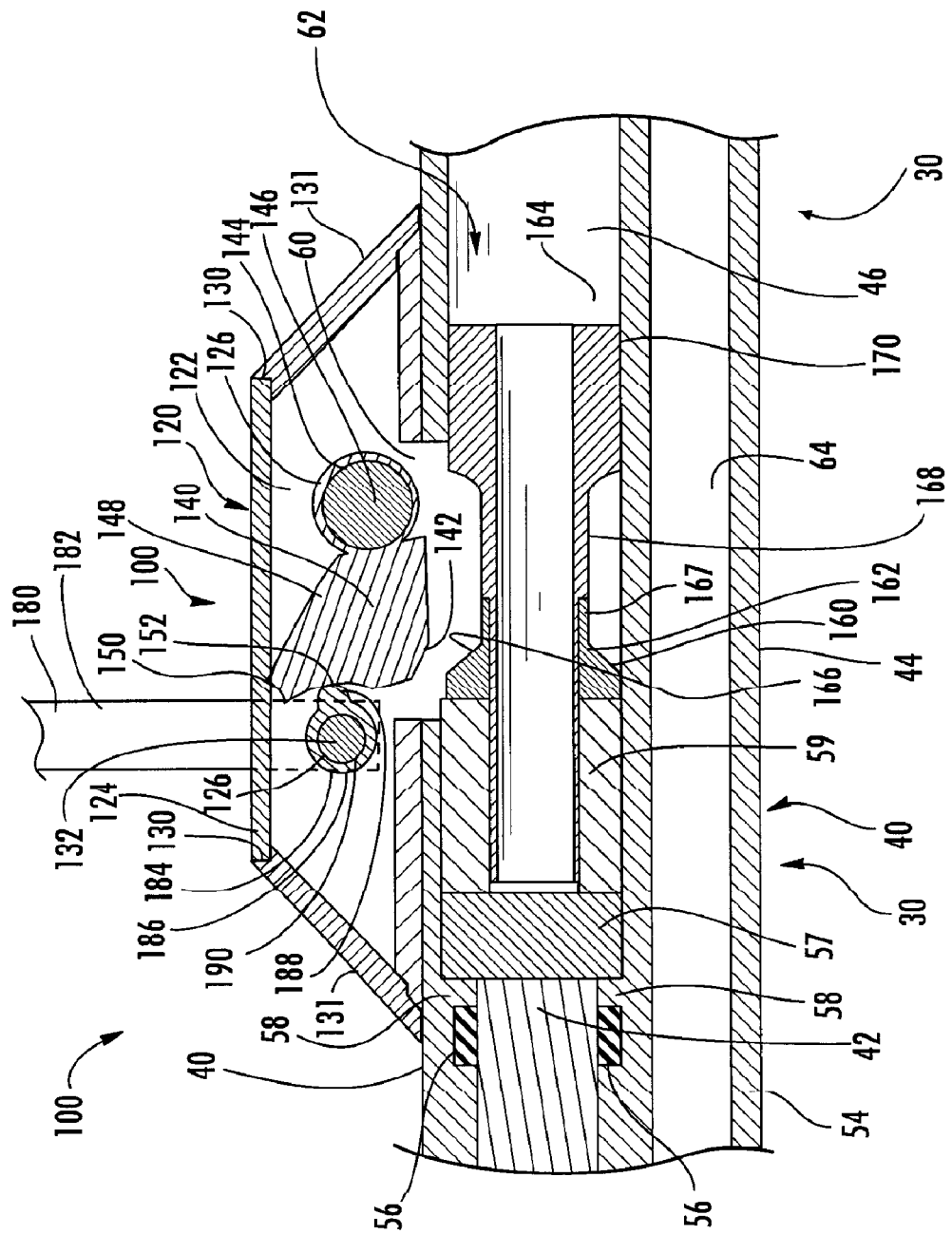
FIG. 5 is substantially a longitudinal cross-sectional view of another embodiment of the invention, wherein the inner bar is in an unlocked position within the outer bar.
Figure 6:
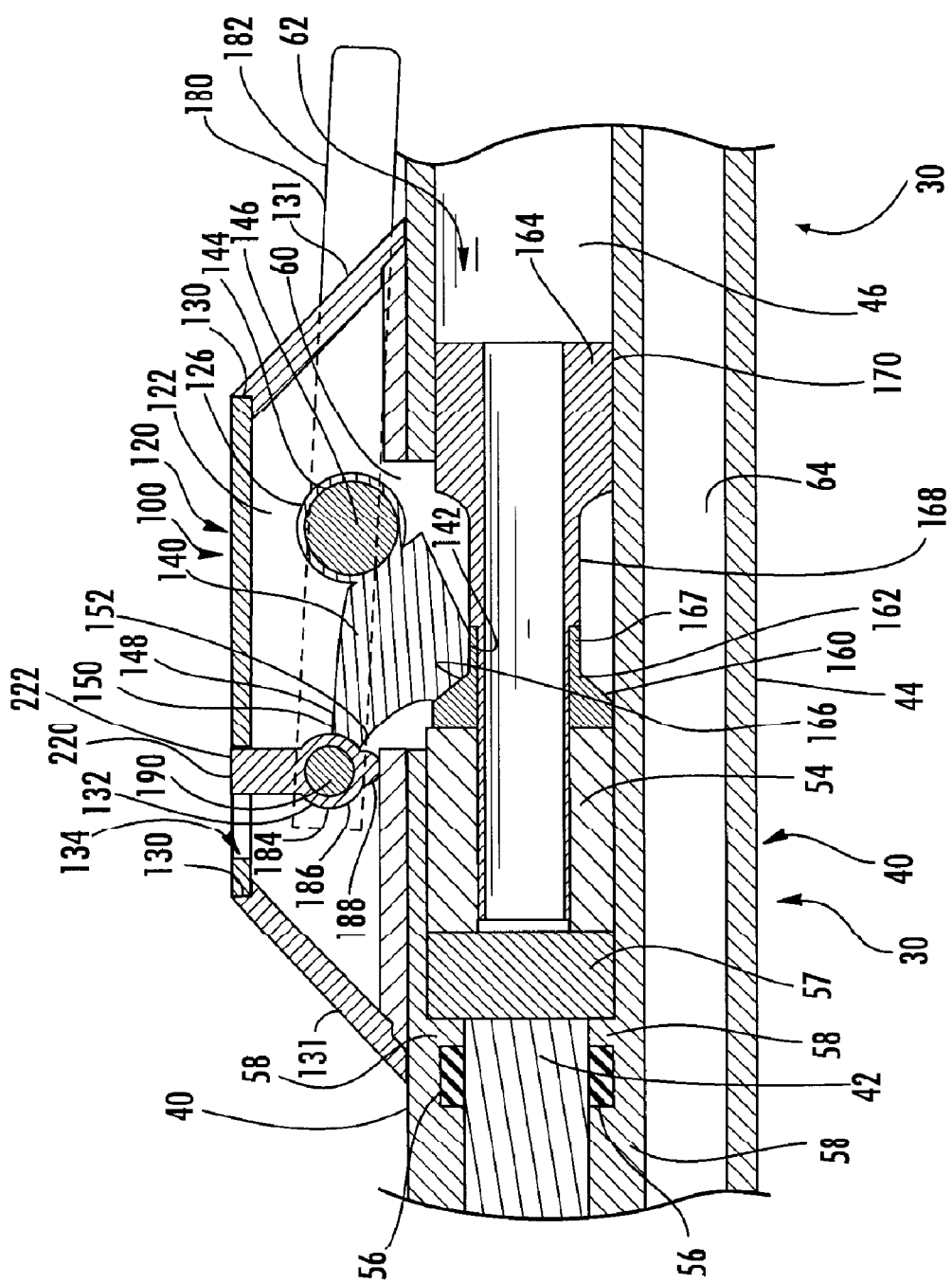
FIG. 6 is substantially a longitudinal cross-sectional view of another embodiment of the invention with a cam-mounted locking indicator in a locked position.
Figure 7:
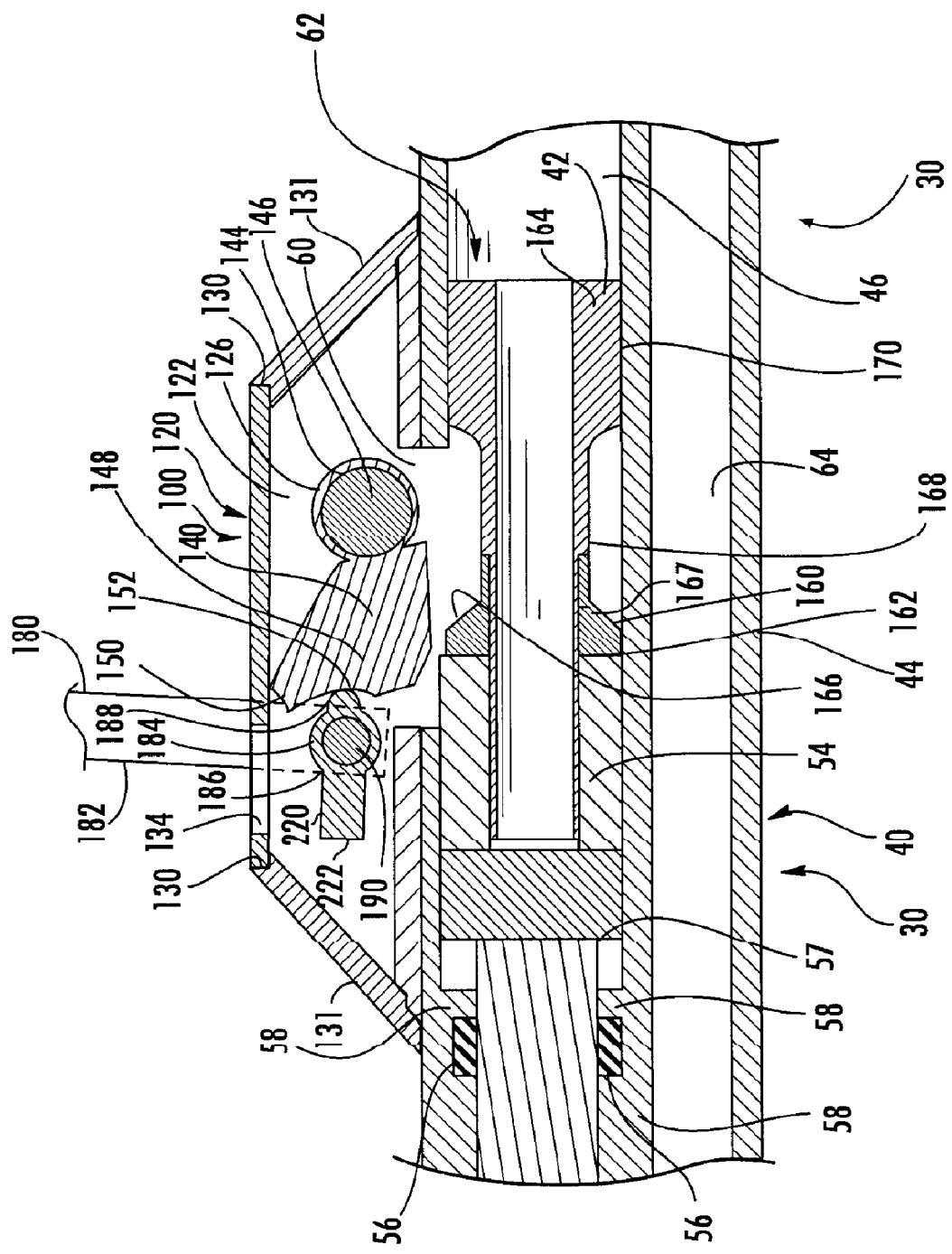
FIG. 7 is substantially a longitudinal cross-sectional view of another embodiment of the invention with a cam-mounted locking indicator in an unlocked position.

In FIGS. 4 and 5, another embodiment of the pawl release mechanism 180 may comprise a rotation device 182 that may be radially attached to a cam 184 instead of the pawl 140. The cam 184 may comprise a cam axis 186 with a projecting lobe 188. The cam axis 186 may comprise a set of cam ends 190, which may be movably (e.g., rotatably) received into a corresponding set of cam apertures 132 located on the lock housing 120. In at least one embodiment, at least a portion of one cam end 190 may be positioned outside of the lock housing 120, while at least a significant portion of the cam 184 could be seen as being held within the interior 122 of the lock housing 120. The cam 184, in at least one embodiment, could be made of strong, corrosion-resistant material (e.g., 17-4 stainless steel, which has been heat treated to 42 Rockwell hardness). The rotational device 182 (e.g., a lever) may be radially attached to the end 190 of the cam axis 186, which may be located outside of the lock housing 120. In this manner, the rotational device 182 may be located outside of the lock housing 120 for ease of access and operation by the operator.

In at least one embodiment, the pawl 140 could have a protrusion or pawl projection 148, which may generally act as the contact area for the lobe 188 of the cam 184. This pawl projection 148 could be generally located on and may project from a side of the pawl 140 towards the direction of the cam 184. A tip 150 of the pawl projection 148 could moveable rest against or upon a non-lobe portion of the cam 184 when the pawl projection 148 is not engaged by the lobe 188. The underside surface 152 of the pawl projection 148, where the lobe 188 could contact the pawl projection 148, could be curved to facilitate the movement of the lobe 188 against the pawl projection 148. The pawl projection 148 (as could the pawl 140), in at least one embodiment, could be made of generally strong, corrosion-resistant material (e.g., 17-4 stainless steel, which has been heat treated to 42 Rockwell hardness).

To release the pawl 140 from the pawl engagement section 160, the cam 184 could be moved by the rotation device 182 into contact with the pawl 140. The general movement (e.g. rotation) of the cam 184 in this manner may move (e.g. pivot or otherwise rotate) the pawl 140 (and its operating area 142) and out of contact with the pawl engagement section 160 (e.g., the anvil 162).

Reffering to figures 2 and 3, a biasing device 200 or other resilient member may be generally employed to orient the pawl 140 (e.g., operating area 142) towards the anvil 162 of the pawl engagement section 160 of the inner bar 42. In this manner, the pawl biasing device 200 may be used to ensure that the interlocking device 100 stays generally locked when engaged by the operator and does not generally unlock until disengaged by the operator. The pawl biasing device 200 may also be seen as providing the force against which the pawl release mechanism 180 must generally work against when pawl release mechanism 180 is used to generally move the pawl's operating area 142 out of contact with the anvil 162.

In at least one embodiment, the pawl biasing device 200 may comprise a spring 202 surrounding a spring pin 204, which may be generally located within the lock housing 120. The spring pin 204 may be held generally in place within the lock housing 120 by engaging the spring pin apertures 128 (figures 1) of the lock housing 120. This location of the spring pin 204 may allow the spring 202 to simultaneously apply opposing forces upon the pawl 140 and interior 122 of the lock housing 120, respectively. Generally, the pawl biasing device 200 may be constructed to provide a sufficient force to ensure that the pawl will properly engage the pawl engagement section 160 and properly lock the inner bar 42 and the outer bar 44 of telescopic tow bar leg(s) 40 relative to one another. This generally ensures that the telescopic tow bar legs stay locked until the operator uses the pawl release mechanism 180 to unlock the telescopic tow bar leg(s) 40.

As substantially shown in FIGS. 6, 7, 8, and 9, at least one embodiment of the invention could have a locking indicator 220. In one such version, the locking indicator 220 could comprise a finger-like protrusion 222 that could be mounted on the pawl release mechanism 180 or the pawl 140. In pawl release mechanism version of the locking indicator 220, the finger-like protrusion 222 could be radially-mounted on the cam 184. At least a portion of the locking indicator 220 could pass through the locking indicator aperture 134 that is generally located at the top of the lock housing 120. When the interlocking device 100 is in the locked position, the rotation of the cam 184 could position or place the finger-like protrusion 222 in a generally upright position against an edge of the locking indicator aperture 134. This general positioning of the locking indicator 220 along with indicia (not shown) placed on the lock housing exterior 124 may be used to generally communicate to the operator that the interlocking device 100 is fully engaged in the locked position (e.g., that the position of the inner bar 42 is generally fixed in relation to the outer bar 44). When the rotation of the cam 184 begins to generally move the pawl's operating area 142 away from the anvil 162, the general removal of the locking indicator 220 away from the locking indicator aperture 134 (or away from the locked position of the locking indicator 220) could be used to communicate to the operator that the interlocking device 100 is generally in the unlocked position or that the interlocking device is generally not properly engaged in the locked position (e.g., that the position of the inner bar 42 is not fixed in relation to the outer bar 44).

Figure 8:
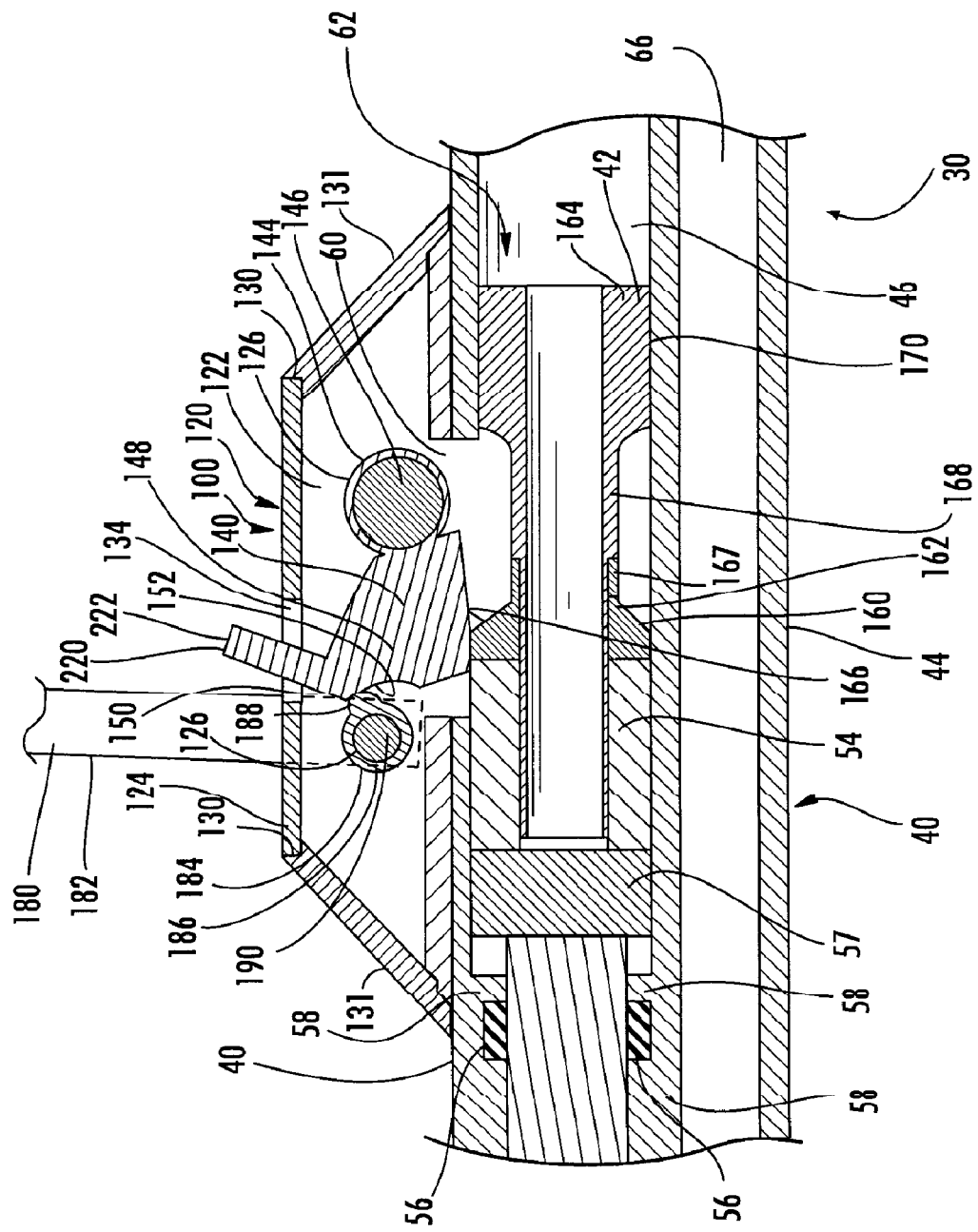
FIG. 8 is substantially a longitudinal cross-sectional view of another embodiment of the invention with a pawl-mounted locking indicator in an unlocked position.
Figure 9:
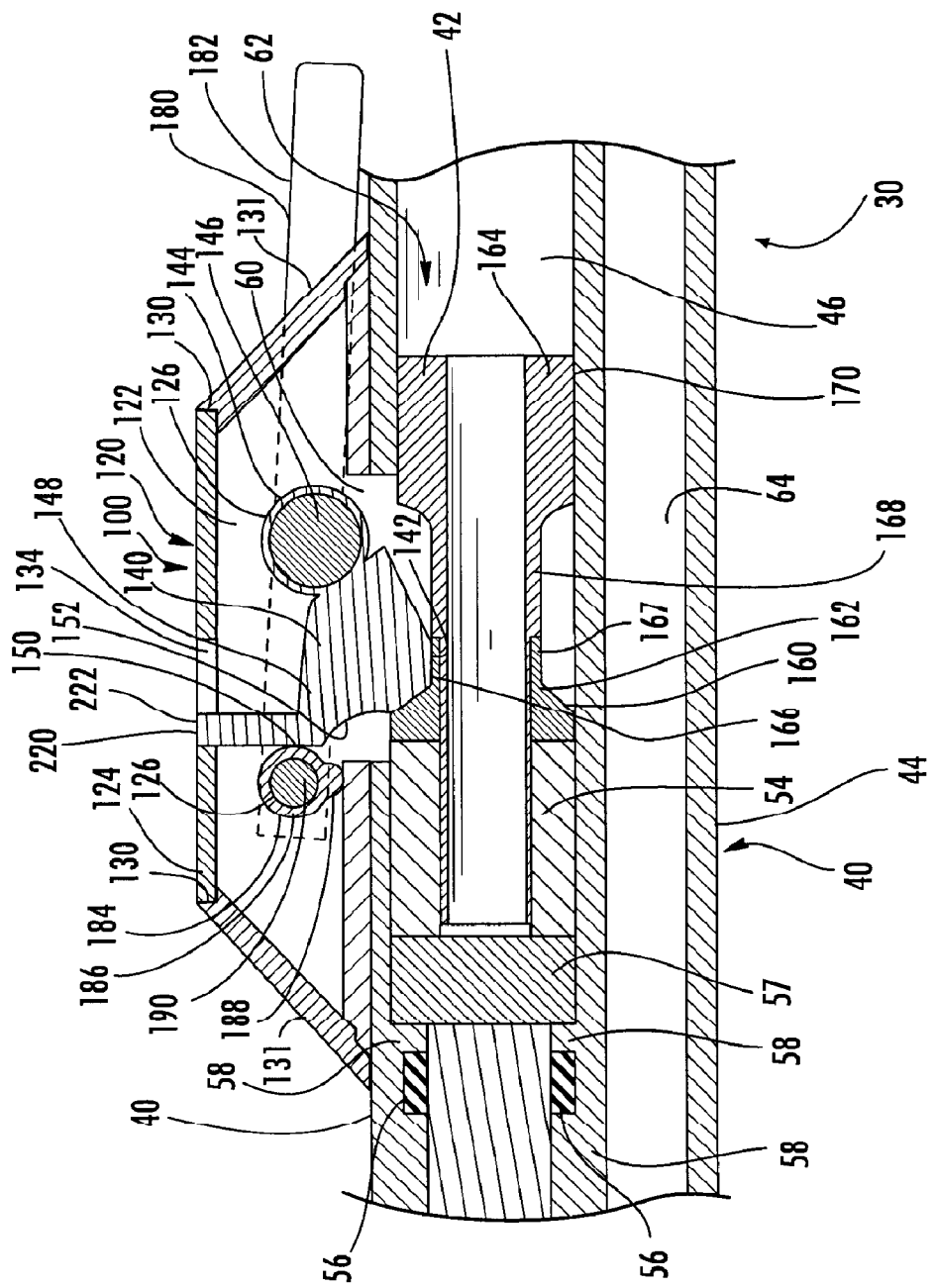
FIG. 9 is substantially a longitudinal cross-sectional view of another embodiment of the invention with a pawl-mounted locking indicator in a locked position.

The FIGS. 8 and 9 substantially show the pawl mounted version of the locking indicator 220 whereby the finger-like protrusion 222 is mounted to the pawl 140. For the cam operated embodiment of the pawl release mechanism 180, the fingerlike projection may be mounted on the tip of the pawl projection 148 of the pawl 140. During operation, at least a portion of the finger-like protrusion 222 could also generally pass through the locking indicator aperture 134. Similarly, when the interlocking device 100 is generally located into its locked position, the position of the pawl 140 may place the finger-like protrusion 224 in a generally upright position against an edge of the locking indicator aperture 134 (e.g., the "locked position" of the locking indicator 220, finger-like projection 222). When the rotation of the pawl 140 begins to move the pawl's operating area 142 away from the anvil 162, a corresponding general removal of the locking indicator 220 away from the edge of the locking indicator aperture 134 (e.g., away from the "locked position" of the locking indicator 220, finger-like projection 222) may be used to generally communicate to the operator that the interlocking device 100 is in the unlocked position or that the interlocking device 100 is not properly engaged in the locked position.

Operation of the Invention

Figure 10:
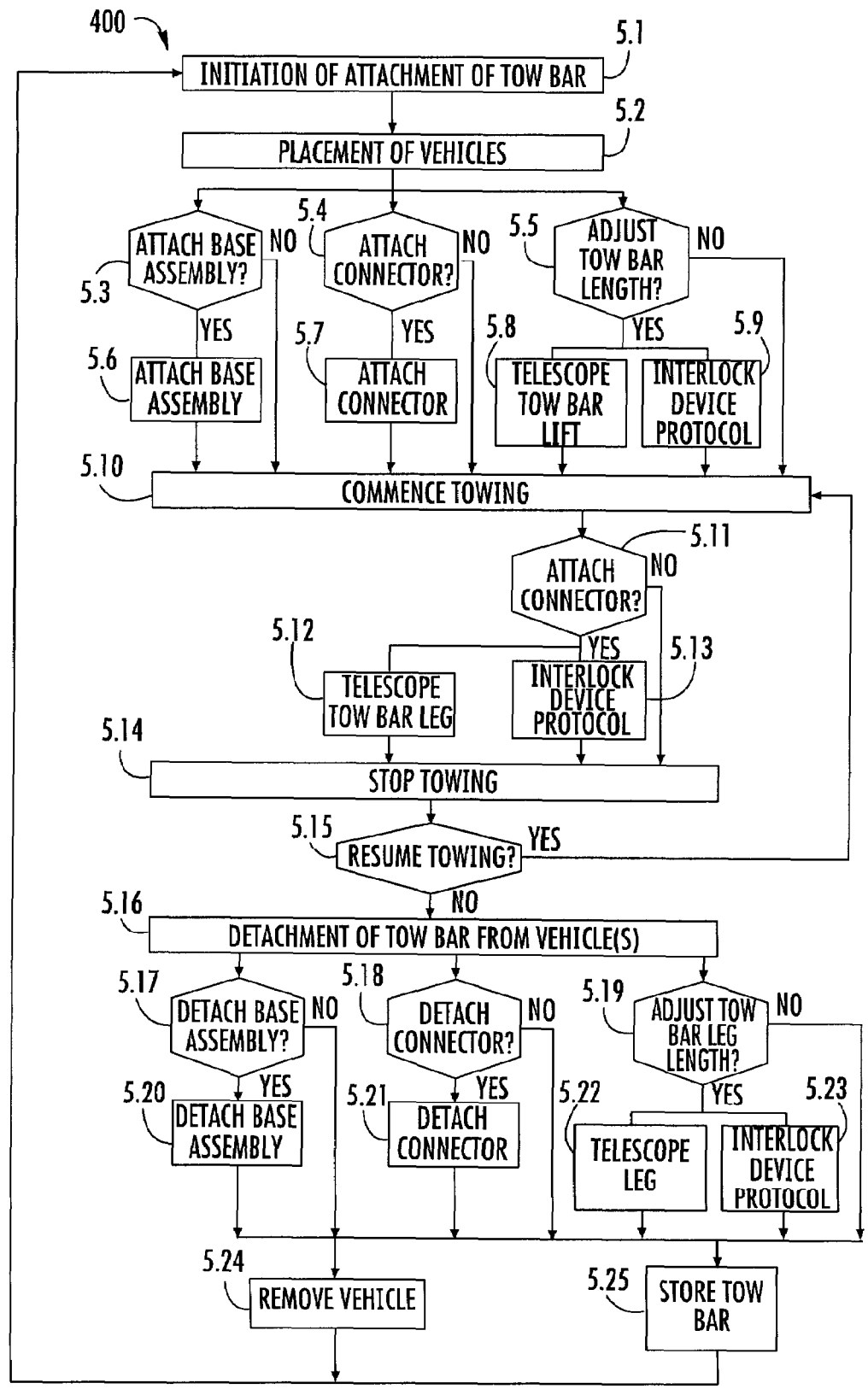
FIG. 10 is substantially a flow chart for one possible embodiment for a process to operate the invention.

FIG. 10 generally shows one possible embodiment of the process or method of for using a tow bar 30. This tow bar 40 operation process, generally indicated by reference numeral 400, could be initiated with step 5.1, the commencing the attachment of the tow bar 30. Step 5.1 could comprise such activities such as procuring the tow bar 30, unpacking it from stowage, and the like. After step 5.1 is completed, the process could proceed to step 5.2, the placement of the vehicles involved in the towing process.

At step 5.2, the placement of the vehicles involved in the towing process, the operator(s) could move the vehicles (e.g., the towing vehicle 10, the towed vehicle 20 and the like) to relative proximity to one another for the attachment of the tow bar 30 each of the vehicles involved in the process. Generally speaking, the relative proximity or distance between the vehicles would be the same as or less than the length of a fully extended tow bar 30 being used in the process. Also, in at least one embodiment, the vehicles should be generally oriented so that their respective points of tow bar attachment generally face one another. After step 5.2 is completed, the process 400 proceeds to three decisions: step 3, the decision as to whether to attach the base assembly 32 to the towed vehicle 20; step 5.4, the decision as to whether attach connector bar 34 of the tow bar 30 to the towing vehicle 10; and step 5.5, the decision as to whether to adjust the length of the tow bar 30.

Step 5.3, the decision as to whether to attach the base assembly 32 to the towed vehicle 20, generally depends on whether the tow bar 30 was previously stored attached to the towed vehicle 20. If the decision answer is no, then the process 400 could proceed to step 5.10, the commencement of towing. If the decision answer is yes, then the process 400 proceeds to step 6, the attachment of base assembly 32 to the towed vehicle 20.

Step 5.6, the attachment of base assembly 32 to the towed vehicle 20, could include the generally reversible attachment of base assembly 32 to the towed vehicle 20 using suitable means and methodology. These means and methodologies could include, but not be limited to, attaching the base assembly 32 to the chassis (not shown), body 24, bumper 22 and the like of the towed vehicle 20 by locking gear (e.g. such as clamps, chains, tethers, straps, and the like) (not shown). After completion of step 5.6, the process 400 moves to step 5.10, the commencement of towing.

Step 5.4, the decision whether to attach connector bar 34 of the tow bar 30 to the towing vehicle 10, could depend on if the tow bar 30 was previously stowed attached to the towing vehicle 10. If the decision answer is no, then the process 400 could proceed to step 5.10, commencement of towing. If the decision answer is yes, then the process 400 proceeds to step 7, the attachment of connector bar 34.

At step 5.7, the attachment of the connector bar 34, could involve the reversible attachment of the hitch end 39 (of the connector bar 34) to the receiver hitch 12 of the towing vehicle 10. In at least one embodiment, this could be accomplished using a ball hitch socket (not shown) attached to the connector bar 34 to reversibly engage a ball hitch (not shown) attached to the receiving hitch 12 of the towing vehicle 10. Attachment of the connector bar 34 to the towing vehicle 10 may also be through any other suitable means of attachment. After completion of this step 5.7, the process 400 moves to step 5.10, the commencement of towing.

Step 5.5, the decision whether or not to adjust the overall length of the tow bar 30, could depend on to length of proximate distance between the vehicles involved in the towing process and the overall length of the tow bar at that point. If tow bar 30 can simultaneously engage the vehicles involved in the towing process without having to be expanded or compacted, then used decision answer is no, and the process 400 could proceed to step 5.10, the commencement of towing. If on the other hand, the overall length of the tow bar 40 has to be adjusted so that tow bar 40 may connect to the vehicles involved, then the decision answer is yes, and the process 400 could move to both step 5.8, the telescoping of the telescopic tow bar leg(s) 40 and step 9, the interlocking device 100 operation protocol 500.

Step 5.8, the telescoping the telescopic tow bar leg(s) 40, could comprise moving the 42 inner bar relative (e.g., in or out) to the outer bar 44 to adjust the over all length of the telescopic tow bar leg 40. After competition of this step 5.8, the process could move onto step 5.10, the commencement of towing.

At step 5.9, the interlocking device 100 operation protocol 500 on operating is generally discussed in greater detail below. The interlocking device 100 could generally be manually (e.g., operator operated) disengaged or unlocked to allow the telescopic tow bar leg 40 to compact from its fully extended length or generally be automatically (pawl biasing device 200 operated) engaged or locked to generally allow the telescopic tow bar leg 40 to be fixed in a generally extended state from a compact state. After completion of this step 5.9, the process 400 proceeds to step 5.10, the commencement of towing.

At step 5.10, the commencement of towing, the operator begins to use the towing vehicle 10 to start moving (tow, push and the like) the towed vehicle 20. After this step is completed, the process moves to step 5.11, the second decision as to whether to adjust the tow bar length.

At step 5.11, the second decision as to whether to adjust the tow bar length, if the decision answer is yes, such as when the force of the movement of the towing operations is extending a previously compacted telescopic tow bar leg(s) 40 (in such a compacted state, the interlocking device 100 is not previously engaged or locked), then the process proceeds to both steps 5.12, telescoping the tow bar leg(s) 40, and step 5.13, interlocking device 100 operation protocol 500. If the decision answer is no, such as when the tow bar leg length was previously adjusted and the interlocking device 100 was engaged to lock the length of the telescopic tow bar legs 40, or the towing operation is such that at least one telescopic tow bar leg is left in compacted state for the duration of the actual towing (thus preventing engagement or locking of the interlocking device 100) then the process 400 proceeds to step 5.14, the stop towing.

At step 5.12, the telescoping the telescopic tow bar leg(s) 40, the necessary measures as discussed in step 5.8, telescope the telescopic tow bar leg(s) 40, are taken. After this step 5.12 is completed, the process may proceed to step 5.14, the stop towing.

Step 5.13, interlocking device 100 operation protocol 500, as with step 5.9, is generally discussed in greater detail below. The interlocking device 100 could generally be manually (e.g., operator operated) disengaged or unlocked to allow the telescopic tow bar leg 40 to compact from its fully extended length or generally be automatically (pawl biasing device 200 operated) engaged or locked to allow the telescopic tow bar leg 40 to be generally fixed in an extended state from a compact state. After completion of step 5.13, the process 400 could proceed to step 5.14, stop towing.

At step 5.14, stop towing, the operator may stop towing the towed vehicle 20 using the towing vehicle 10. After step 5.14 is completed, the process 400 may proceed to step 5.15, the decision on whether or not to resume towing activities.

At step 5.15, the decision on whether or not to resume towing activities, if the decision answer is yes, the process 400s returns to step 5.10, commencement of towing activities. If the decision answer is no, then the process 400 moves to step 5.16, the detachment of tow bar 40 from vehicles.

Step 5.16, the detachment of tow bar 40 from one or more of the vehicles involved in the towing operation, may involve three decisions: step 5.17, decision as to whether to detachment of base assembly; step 5.18, decision as to whether detachment of leg connector; step 5.19, decision as to whether to adjust the tow bar length.

At step 5.17, the decision as to whether the detach base assembly 32 from the towed vehicle 20, if the decision answer is no, such as when the tow bar 40 is being stored on the towed vehicle 20, then the process can proceed to step 5.24, the removal of vehicles from close proximity and step 5.25, the stowage of the tow bar. If the decision answer is yes, then the process 400 moves to step 5.20, the detachment of the base assembly 32.

At step 5.20, the detachment of the base assembly 32, the process 400 generally follows the reverse of the procedures implemented in step 5.6, attachment of base assembly 32. After completion of this step 5.20, then the process 400 can proceed to step 5.24, the removal of vehicles from close proximity and step 5.25, the stowage of the tow bar 40.

At step 5.18, the decision as to whether or not to detach the connector bar 34 from the towing vehicle 10, if the decision answer is no, such as where the tow bar 30 will be stowed attached to the towing vehicle, then the process 400 may generally proceed to both step 5.24, the removal of the vehicles from close proximity to one another, and step 5.25, the storage of the tow bar 30. If the decision answer is yes, then the process 400 proceeds to step 5.21, the detachment of the connector bar 34.

At step 5.21, the detachment of the connector bar 34 from the towing vehicle 10 follows the reverse of the procedure that is generally followed in step 5.7, the attachment of connector bar 34. After this step 5.21 is completed, the process 400 may generally proceed to both step 5.24, the removal of the vehicles from close proximity to one another, and step 5.25, the storage of the tow bar 30.

At step 5.19, the decision as to whether to adjust of the length of the telescopic tow bar leg 40, the decision answer could be yes under several conditions. One possible condition is where one vehicle involved in the towing operation is parked on an incline relative to the another vehicle involved in the towing operation so that the parked vehicles may be exerting pressure upon the towing bar 40, thereby generally interfering with the removal of the tow bar 30 from one or more of the said vehicles. In such circumstances, the interlocking device 100 may need to be disengaged under pressure to allow the telescopic tow bar leg(s) 40 to be compacted thus generally relieving the vehicles' pressure on the tow bar 40 for tow bar's removal.

If the decision answer is yes, the process could generally move onto to steps 5.23, the operation of the interlocking device 100, and step 5.22, the telescoping of telescopic tow bar leg(s) 40.

If the decision answer is no, such as when then there is no vehicular pressure upon the tow bar 30, then process 400 may generally proceed to step 5.24, removal of the vehicles from close proximity to one another, and step 5.26, the storage of the tow bar 40.

Step 5.23, the operation of the interlocking device 100, will be described below in greater detail. After completion of this step 5.23, the process proceeds to step 5.23, the adjustment of the telescopic tow bar leg(s) 40.

Step 5.22, the adjustment of the telescopic tow bar leg(s) 40, the tow bar leg length is adjusted as described in earlier steps 5.8 and 5.12. After completion of this step 5.22, the process may generally proceed to both step 5.24, the removal of the vehicles from close proximity to one another, and step 5.25, storage of the tow bar 40.

At step 5.24, the removal of vehicles from close proximity to one another, one or more of the vehicles can be driven off under its own power or otherwise moved by the operator(s). As stated above, the towing vehicle 10 such as a camper could be left at a destination (e.g., campsite), while the towed vehicle 20, such as a passenger car, could be used as transport to and from the campsite. At the completion of step 5.18, the process 400 may return to step 5.1, initiation of attachment of tow bar 30.

At step 5.25, the storage of the tow bar 30, may encompassing the telescoping of one or more of the telescopic tow bar legs 40 to their generally most compact length to generally allow the tow bar 40 to be placed in its most compact state for ease of storage. This storage could possibly be generally accomplished by putting the fully disconnected tow bar 40 in storage bag (not shown) and stowing the enclosed tow bar 40 in one of the vehicles used in the towing operation. Additionally, the tow bar 40 could be left attached to one of the vehicles used in the towing operation. As such the tow bar 30, after being appropriately covered to prevent scratching of the attached vehicle, could be pivoted upwards and secured against the end of the attached vehicle. At the completion of this step 5.25, the process 400 may return to step 5.1, the imitation of the attachment of the tow bar 30.

Interlocking Device Operation Protocol

Figure 11:
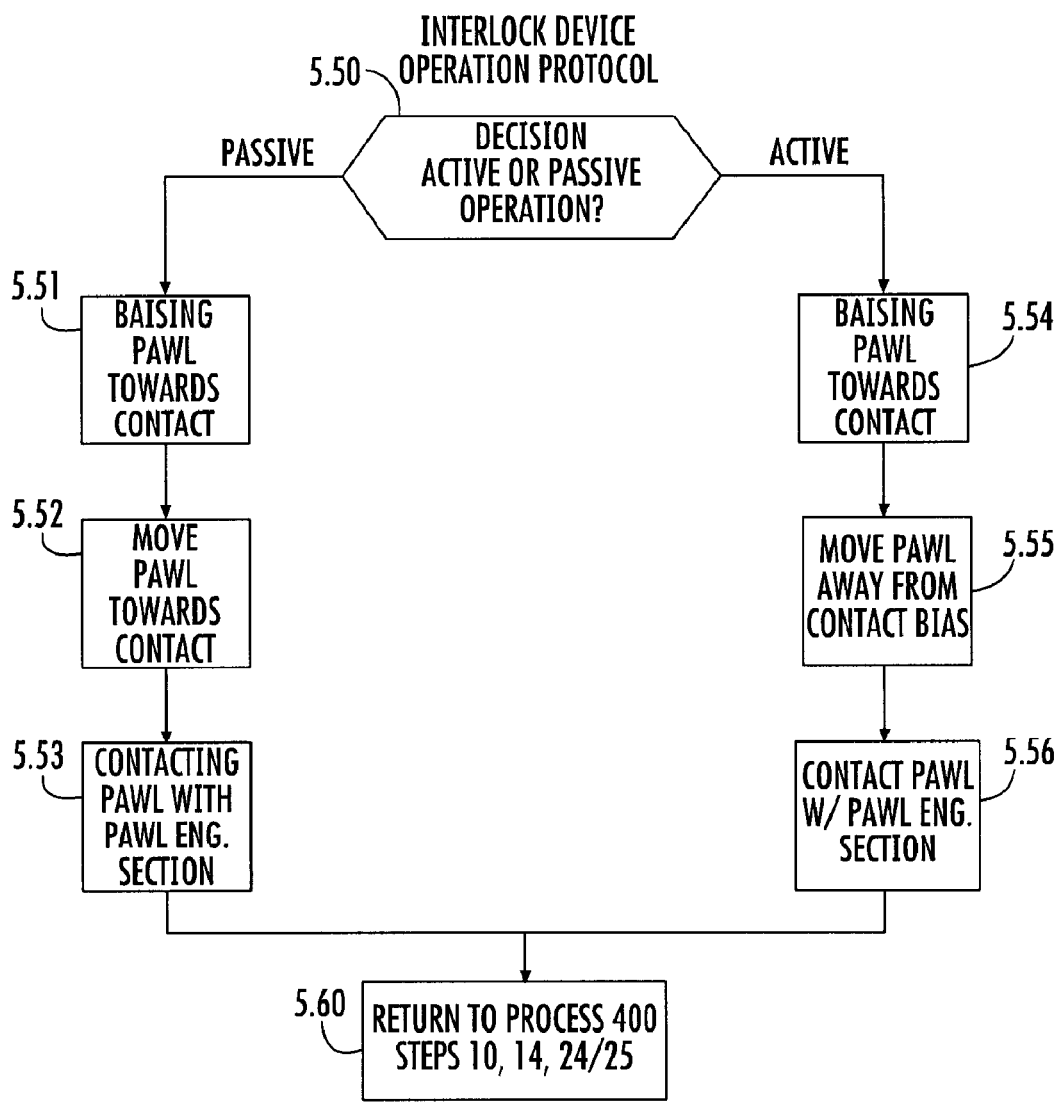
FIG. 11 is substantially a flow chart for one possible embodiment for a process to operate the interlocking device.

As generally shown in FIG. 11, the one possible embodiment for the interlocking device 100 operation protocol, generally indicated by reference numeral 500, as referenced above in steps 5.9, 5.13 and 5.23, can be seen as being initiated by steps 5.5, 5.11, 5.19 the decision as to adjust tow bar length 40. This decision may be seen as being generally based on at least two circumstances. In the first circumstance, there is no need to change the operational status of the interlocking device 100 (e.g., the interlocking device 100 is generally fully engaged to lock the telescopic bar leg 40 maintain it in an extended state, or the interlocking device 100 is generally not fully engaged to allow the telescoping of the telescopic bar leg 40 in a compacted state.) In the second circumstance, the operational status of the interlocking device 100 has to be changed (e.g., the operator activates the pawl release mechanism 180 to generally unlock or lock the extended telescopic tow bar leg 40 so that it can be generally telescoped into or from a compact state or the pawl biasing device 200 generally automatically locks the telescopic tow bar leg 40 after it has been generally telescoped out to its generally extended state from a compact state).

If there is no need to change the operational status of the interlocking device 100, the protocol 500 could move to the next step in the operation process 400 (e.g. step 5.10, the commencement of towing; step 5.14, the stopping towing; and both step 5.24, removal of vehicle/step 5.25 storage of tow bar 40). If there is need to change the operational status, then the operation process 400 could possibly move on to respective steps 5.9, 5.13 and 5.23, the interlocking device 100 operation protocol 500, as appropriate.

Steps 5.9, 5.13 and 5.23 of the operation process 400, the interlocking device 100 operation protocol 500, can be seen as generally starting with step 5.50, the decision as to whether to engage in passive or active operation of the interlocking device 100. If the decision answer is to engage in active operation (e.g., operator activates the interlocking device 100 to unlock the extended telescopic tow bar leg 40), then the protocol 500 proceeds to step 5.51, the operation of the pawl release mechanism device 180. If the decision is to engage in passive operation (e.g., the invention automatically operates to lock or fix the position inner bar 42 relative to the outer bar 44), then the protocol 500 moves to step 5.51, the biasing of the pawl.

Step 5.51, the biasing of the pawl 140 towards contact, can be seen as generally the first step in the generally passive operation of the interlocking device 100. During the passive operation, the pawl 140 is generally moved into contact (e.g., by the force of the pawl biasing device 200) with the pawl engagement section 160 to lock the telescopic tow bar leg 40 into an extended position.

One embodiment of step 5.51 could be the applying of force to generally orient the pawl 140 and its operating area 142 towards contact with the pawl engagement section 160 and its anvil 162. As stated above, this force can be generally created, in at least one embodiment, by a pawl biasing device 200 that may comprise a generally resilient member such as spring 202. Once step 5.51 is accomplished the protocol 500 can pass onto step 5.52, the movement of the pawl.

Step 5.52, the movement of the pawl towards contact, can be generally started by the above-noted pawl biasing device 200 when the inner bar 42 is so extended from the outer bar 44 that the pawl engagement section 160 has generally presented itself to the biased pawl 140 for automatic contact. In another embodiment, where the rotation device 182 is generally directly attached to the pawl 140, the operator can generally manually engage the pawl 140 (via the rotation device 182) to move (e.g., rotate) the pawl 140 and its operating area 142 towards general contact with the pawl engagement section 160. During this step 5.52, it could be seen that at least a portion of the pawl moves (e.g., rotates) through at least a portion of the pawl aperture 60 on the outer bar 44. After step 5.52 is completed, the protocol 500 generally moves to step 5.53, the contacting pawl 40 with pawl engagement section 160.

Step 5.53, the contacting pawl 40 with pawl engagement section 160, may comprise the step of the contacting of at least two or more surfaces of the operating area 142 of the pawl 140 with the anvil 162 of the pawl engagement section 162. Generally speaking, it would be desirable to have the operating area 142 substantially seat against anvil 162. To generally ensure that this step properly occurs, the step 5.53 may further comprise informing or otherwise communicating to the operator that the telescopic tow bar leg 40 is properly locked in the extended position. This communication could be accomplished in at least one embodiment by moving (e.g., rotating) the locking indicator 220 (e.g., finger-like protrusion 222) to its "locked" position. In at least one embodiment, this locked position could be the placement of the locking indicator 220 to the edged of locking indicator aperture 134. After completion of step 5.53, the protocol 500 could to the next step(s) of the operating process 400 (e.g., step 10, the commencement of towing; step 5.14, the stop towing; step 5.24, the removal of vehicle(s)/step 5.25, the storage of the tow bar 30).

Step 5.54, the biasing of the pawl 140 towards contact, may be seen as the first step in the active operation of the interlocking device 100. During the active operation, it can be generally seen that the operator generally moves the pawl against the force of the pawl bias device 200 to unlock the extended telescopic tow bar leg 40, allowing it to be telescoped into a more compact state. In step 5.54, the applying of force of the pawl biasing device 200 is to generally orient the pawl 140 and its operating area 142 towards maintaining contact with the pawl engagement section 160 and its anvil 162. As stated above, this force can be generally created, in at least one embodiment, by a generally resilient member such as spring 202. Once step 5.54 is accomplished, the protocol 500 can pass onto step 5.55, the movement of the pawl 140 away from contact.

In step 5.55, the movement of pawl 140 away from contact, the operator either directly or indirectly begins to move the pawl 140 and its respective operating area 142 away from contact with the anvil 162 of the pawl engagement section 160 by activating the pawl release mechanism 180. In one embodiment, such as where the pawl release mechanism 180 has the rotation device 182 directly attached (e.g., a lever radially attached) to the pawl 140, the operator moves (e.g. rotates) the rotation device 182 to move (e.g. rotate) the pawl 140. In another embodiment, where the rotation device 182 is not directly attached to the pawl but instead to a cam 184 proximate to the pawl 140, the operator moves (e.g., rotates) the rotation device 182 to move (rotate) the cam 184. As the cam 184 moves (e.g. rotates), it moves (e.g., rotates) a lobe 188 into contact with the pawl 140. As the lobe 188 contacts the pawl 140 (e.g. the underside 152 of a pawl projection 148), the lobe 188 rotates (e.g. lifts up) the pawl 140 away from the pawl engagement section 160 of the inner bar 42. In doing so, the pawl 140 is moved against the force created by the pawl biasing device 200, as well as moving at least a portion of the pawl 140 through at least a portion of the pawl aperture 60 of the outer bar 44. As step 5.55 is generally completed, the protocol 500 moves onto step 5.56, the removal of the pawl 140 from contact with the pawl engagement section 160.

Step 5.56, the removal of the pawl 140 from contact with the pawl engagement section, the operating area 142 of the pawl 140 is fully removed from contact with the anvil 162 of the pawl engagement section 160. At this point, the telescopic tow bar leg 40 is no longer locked by the interlocking device 100 and can be telescoped into a more compact state.

To generally ensure that step 5.56, the removal of the pawl 140 from contact with the pawl engagement section, properly occurs, the step 5.56 may further comprise informing or otherwise communicating to the operator that the telescopic tow bar leg 40 is properly unlocked and is ready to be placed in a move compact state. This communication could be accomplished, in at least one embodiment, by moving (e.g., rotating) the locking indicator (e.g., finger-like protrusion 222) to its "unlocked" position. In at least one embodiment, this unlocked position could be the placement of the locking indicator 220 away from the edged of locking indicator aperture 134 (e.g., placement within the interior 122 of the lock housing 120). After completion of step 5.53, the protocol 500 could go to step 5.60, return the appropriate step(s) of the operating process 400 (e.g., step 5.10, the commencement of towing; step 5.14, the stop towing; step 5.24, the removal of vehicle(s), step 5.25, the storage of the tow bar 40).

After the completion of step 5.56, the protocol 500 proceeds to Step 5.60, return to the next appropriate step(s) of the operating process 400 (e.g., step 5.10, the commencement of towing; step 5.14, the stop towing; step 5.24, the removal of vehicle(s), step 5.25, the storage of the tow bar 40).

CONCLUSION

As described, above the invention can be seen as being generally able to resist unwanted binding by the interlocking devices for the telescopic legs of the tow bar, the binding being caused by corrosion, dirt, pressure and the like. The invention can also be seen to provide a separate mechanism to indicate when the locking mechanism for the telescopic tow bar leg is fully engaged. Although the description above contains many specifications, these should not be construed as limiting the scope of the invention but as merely providing illustrations of some of presently preferred embodiments of this invention. Thus, the scope of the invention should be determined by the issued claims and their legal equivalents rather than by the examples given.

What is claimed is:

1. A telescopic tow bar leg comprising: at least one inner bar, the inner bar having a pawl engagement section; at least one outer bar, the outer bar being configured to slideably receive the inner bar; at least one pawl, the pawl having an operating area with at least two surfaces, the pawl being rotateably supported and positioned by the outer bar to allow the at least two surfaces to contact the pawl engagement section; wherein the contact of the at least two surfaces with the pawl engagement section locks the position of the inner bar relative to the outer bar the telescopic tow bar leg further comprising a pawl release mechanism having a rotatable cam which contacts the pawl to bring the pawl out of contact with the pawl engagement section.

2. The telescopic tow bar leg of claim 1 wherein the pawl mounts a locking indicator.

3. The telescopic tow bar leg of claim 1 wherein the cam contacts a projection protruding from the pawl.

4. The telescopic tow bar leg of claim 3 wherein the cam mounts a locking indicator.

5. The telescopic tow bar leg of claim 3 wherein the locking indicator further comprises a finger-like protrusion whose position can be used to denote that the position of the inner bar could be changed relative to the outer bar.

6. The telescopic tow bar leg of claim 4 wherein finger-like protrusion can pass through a locking indicator aperture located on a lock housing situated on the outer bar.

7. The telescopic tow bar leg of claim 1 wherein pawl engagement section further comprises an anvil and a shoulder sleeve, the anvil having an angled shoulder and an collar portion.

8. The telescopic tow bar leg of claim 7 wherein one surface of the operating area contacts the angled portion while another surface of the operating area contacts the collar portion.

9. The telescopic tow bar leg of claim 8 wherein the shoulder sleeve further comprises a waist and shoulder section, the surface of the operating area that contacts the collar portion of the anvil is oriented parallel to the surface of the shoulder section of the shoulder sleeve.

10. The telescopic tow bar leg of claim 8 wherein at least one surface of the pawl that contacts the angled portion of the anvil and the angled portion of the anvil have the equal radial faces at one or more points of mutual contact as measured from the axis of the pawl.

11. A locking telescopic tow bar comprising:
(A) a pawl means for locking the length of the tow bar, the pawl means have at least two surfaces;
(B) an anvil means for abutting the surfaces; and
(C) a release means for releasing the pawl means by removing the at least two surface means from contact with the anvil means, the release means having a rotatable cam which contacts the pawl means to bring the pawl means out of contact with the anvil means.

12. The tow bar of claim 11 wherein the two surface means are in different planes from one another.

13. The tow bar of claim 11 wherein the cam means further rotates the pawl means.

14. A method of operating a telescopic tow bar comprising, but not limited to the order presented:
(A) rotating a pawl having at least two surfaces, the pawl being moveably mounted on an outer bar;
(B) contacting at least two of the at least two surfaces of the pawl against a pawl engagement section of an inner bar;
(C) releasing at least two surfaces of the pawl from the pawl engagement section; and
(D) slideably moving an inner bar relative to the outer bar; wherein the releasing the portion of the pawl further comprises rotating a cam into contact with the pawl to bring the pawl out of contact with the pawl engagement section.

15. A method of operating a tow bar of claim 14 wherein the contacting the pawl further comprises contacting a pawl projection protruding from the pawl.

16. A method of operating a tow bar of claim 14 wherein rotating a cam further comprises moving a locking indicator.

17. A method of operating a tow bar of claim 16 wherein moving a locking indicator further comprises moving a finger-like projectile through locking indicator aperture.

* * * * *